12) United States Patent
Schick et al.

(10) Patent No.: US 7,320,246 B2
(45) Date of Patent: Jan. 22, 2008

(54) VEHICLE TIRE DIAGNOSIS METHOD AND APPARATUS

(75) Inventors: Bernhard Schick, Karlsruhe (DE); Lars Netsch, Schöngeising (DE)

(73) Assignee: TÜV Automotive GmbH (DE)

( * ) Notice: Subject to any disclaimer, the term of this patent is extended or adjusted under 35 U.S.C. 154(b) by 58 days.

(21) Appl. No.: 10/512,726

(22) PCT Filed: Apr. 25, 2003

(86) PCT No.: PCT/EP03/04329

§ 371 (c)(1),
(2), (4) Date: Oct. 26, 2004

(87) PCT Pub. No.: WO03/091046

PCT Pub. Date: Nov. 6, 2003

(65) Prior Publication Data

US 2005/0150283 A1 Jul. 14, 2005

(30) Foreign Application Priority Data

Apr. 26, 2002 (DE) ................................ 102 18 781

(51) Int. Cl.
G01M 17/02 (2006.01)
(52) U.S. Cl. ........................................ 73/146; 702/188
(58) Field of Classification Search ................. 73/146; 702/188, 169; 701/36
See application file for complete search history.

(56) References Cited

U.S. PATENT DOCUMENTS

| 4,570,152 | A |   | 2/1986  | Melton et al. |                |
|-----------|---|---|---------|---------------|----------------|
| 4,872,699 | A | * | 10/1989 | Grove et al.  | ........ 280/86.753 |
| 4,909,074 | A |   | 3/1990  | Gerresheim et al. |            |
| 5,071,259 | A |   | 12/1991 | Metzger et al. |               |
| 5,502,433 | A |   | 3/1996  | Breuer et al. |                |
| 5,663,496 | A |   | 9/1997  | Handfield et al. |             |
| 5,812,256 | A | * | 9/1998  | Chapin et al. | ........ 356/139.09 |
| 5,913,240 | A |   | 6/1999  | Drahne et al. |                |
| 5,930,881 | A | * | 8/1999  | Naruse et al. | ........ 29/407.08 |
| 5,939,977 | A |   | 8/1999  | Monson        |                |
| 5,964,265 | A |   | 10/1999 | Becherer      |                |
| 6,651,495 | B2 |  | 11/2003 | Lonsdale et al. |              |
| 6,888,471 | B2 |  | 5/2005  | Elsner et al. |                |
| 6,958,615 | B2 |  | 10/2005 | Poulbot et al. |               |
| 6,959,593 | B2 |  | 11/2005 | Mancosu et al. |               |
| 2003/0021330 | A1 | | 1/2003 | Aubel et al.  |                |
| 2003/0117275 | A1 | | 6/2003 | Watkins       |                |
| 2004/0061601 | A1 | | 4/2004 | Freakes et al. |               |
| 2004/0196147 | A1 | | 10/2004 | Albuquerque   |                |
| 2004/0196148 | A1 | | 10/2004 | Albuquerque   |                |

FOREIGN PATENT DOCUMENTS

DE 40 09 540 9/1991
DE 100 07 558 8/2001

* cited by examiner

Primary Examiner—Andre J. Allen
(74) Attorney, Agent, or Firm—Robert W. Becker & Associates; Robert W. Becker

(57) ABSTRACT

An on-board vehicle diagnostic system includes sensors for detecting vehicle operating parameters, such as speed, wheel speed, yaw rate, transverse acceleration, and/or tire operating parameters, such as the tire inflation pressure and the temperature at the belt edge. Relationships between the parameters are stored in a diagnostic model so that depending on the complexity level of the system and performance requirements, predictions regarding the wear condition of the tire and/or defective vehicle adjustments are possible.

22 Claims, 8 Drawing Sheets

VEHICLE TIRE DIAGNOSIS METHOD AND APPARATUS

This application is the US national stage filing of International application no. PCT/EP03/04329, which claims priority to German patent application no. 102 18 781.9.

1. Technical Field

The present invention relates to a method for monitoring a vehicle tire, a method for monitoring a vehicle, a method for generating a vehicle-tire interaction model, and a method for generating a vehicle-tire reliability map. The present invention also relates to a vehicle diagnostic system.

2. Description of the Prior Art

The tires on vehicle wheels provide the contact between the roadway and the vehicle. They are critically important to the safety and the comfort of the vehicle. The tire is a complex component, whose service life depends on a plurality of influencing values. In particular, one critical value for the tire condition is the temperature in the tire shoulder, i.e. in the junction region between the sidewall and the tire tread. Significant deformation occurs in this region as a consequence of excessive operational demands due to excessive vehicle loading, high lateral forces, or insufficient air pressure, and leads to excessive temperatures. If certain critical temperatures are exceeded, the tire is irreversibly damaged, which can result in the loss of its functional capability. Incorrect tire parameters, such as insufficient air pressure, or incorrect vehicle parameters, such as incorrect adjustment of the wheel camber or the wheel toe, may be decisive in this context.

SUMMARY

In one aspect of the present teachings, methods for monitoring a vehicle include providing a vehicle- and/or tire-specific diagnostic model for use in calculating at least one tire deterioration parameter value relevant to tire deterioration from the values of adjustment parameters and operating parameters relevant to the loading of the vehicle tire. A tire deterioration model is provided for use in determining a tire deterioration characterizing value from the time progression of the at least one tire deterioration parameter value. The values of the operating parameters are detected and the at least one tire deterioration parameter value is calculated. The time progression of the at least one tire deterioration parameter value is stored and the tire deterioration characterizing value is determined.

The at least one tire deterioration parameter value and/or the tire deterioration characterizing value may be inserted into the diagnostic model and/or the tire deterioration model. Further, the at least one tire deterioration parameter value may be calculated and detected by a sensor, and the tire deterioration model may be adapted in the case of a difference between the calculated and measured value.

In another aspect of the present teachings, methods for monitoring a vehicle include providing a vehicle- and/or tire-specific diagnostic model for use in calculating at least one vehicle adjustment parameter from at least one tire deterioration parameter value relevant to vehicle tire deterioration and the value of at least one vehicle operating parameter. The values of the at least one tire deterioration parameter and the value of the at least one vehicle operating parameter are detected and the value of the at least one vehicle adjustment parameter is calculated.

The time progression of the at least one tire deterioration parameter may be detected and inserted into the diagnostic model. Further, the value of at least one vehicle adjustment parameter may be calculated and detected by a sensor, and the diagnostic model may be adapted in the case of a difference between the calculated and measured values.

In addition, the value of at least one environmental parameter is detected and inserted into the diagnostic model.

In another aspect of the present teachings, methods for generating a vehicle-tire interaction model include calculating a tire- and vehicle-specific virtual map, which includes at least one tire deterioration relevant parameter that is dependent on vehicle operating parameters. A tire- and vehicle-specific real map is determined by testing, which map includes at least one tire deterioration relevant parameter that is dependent on the vehicle operating parameters used to perform the tests. Then, the virtual and real maps are combined to form one vehicle-tire interaction model. In another aspect of the present teachings, method for generating a vehicle-tire reliability map include determining a tire- and vehicle-specific map having at least one tire deterioration relevant parameter that is dependent on vehicle operating parameters. The service life of the tire for different values of the tire deterioration relevant parameter is determined by testing and the reliability map is generated from the tire- and vehicle-specific map and the determined service life data.

In another aspect of the present teachings, tire diagnostic systems include sensors for detecting the values of at least one vehicle operating parameter and a data processing device connected to the sensors for performing the above-noted methods.

In another aspect, vehicle diagnostic systems include a diagnostic model containing relationships between vehicle adjustment parameters, vehicle operating parameters, tire parameters, tire adjustment parameters, environmental parameters, vehicle parameters, and tire operating parameters. In addition, a device stores at least several of said parameters so that at least some of said parameters, which are not stored, may be determined by entering the stored parameters into the diagnostic model.

The present invention will be explained in greater detail in the following description in view of the drawings and the representative example.

DETAILED DESCRIPTION OF THE INVENTION

Figure 1:
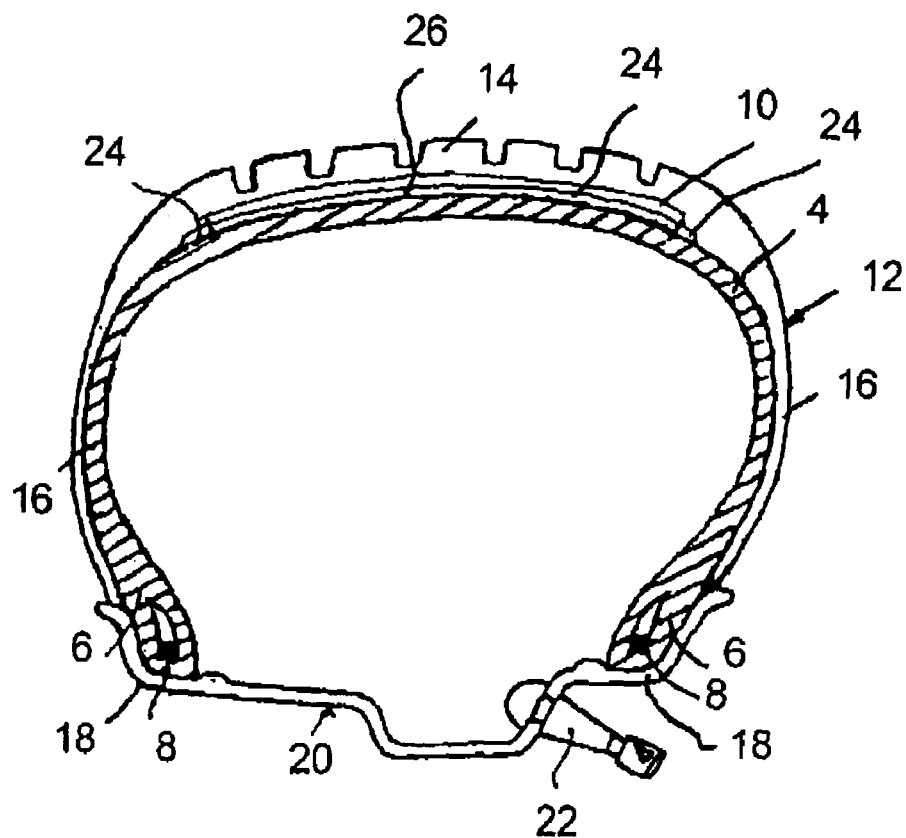
FIG. 1 shows a half cross section of a vehicle tire mounted on a wheel rim.

FIG. 1 shows a cross section through a radial tire, such as are known per se, having a carcass 4, which is made, for example, of two radially running plies of rayon cord threads, which end radially inwardly at beads 6. A belt 10 is disposed in the radially outer region of carcass 4 and is made, for example, of two crossed plies of steel cord threads and two circumferential plies of nylon cord threads. A rubber layer 12 is vulcanized over the carcass and belt 10, respectively, which rubber layer forms the tread 14 on the radially outer region and is part of relatively thin sidewalls 16 in the lateral region. Beads 6 are accommodated in shoulders 18 of a wheel rim 20, which is a part of a wheel (not shown). The tire is air-tight so that compressed air can be introduced into its interior via a valve 22 inserted into the wheel rim. This design is only an example. The below-described invention may be used with a wide variety of tire types.

Tire durability depends on the frictional wear of the material of the tread 14, which is dependent upon the distance traveled, the loads, and the air pressure. The wear of tread 14 can be visually determined without problem. Tire deterioration, which is not easily detectable from the outside and is essentially dependent upon the heat transferred to the tire by power dissipation, presents a more difficult problem. Temperatures in the region of the side edges of belt 10, which are usually the highest temperatures occurring in the tire, are particularly critical in this context. The reason for this is that different elements of the tire, such as the belt, carcass, sidewall, and tread, come together there and shift relative to one another when the tire is deformed. Depending on the intensity and duration, high temperatures in this region can lead to material deterioration or even separation, thereby irreparably damaging the tire.

Therefore, it is advantageous for tire diagnostics to determine the temperature, either directly or indirectly, in particular within the region of the edges of shoulder 10. The temperature may be determined directly by arranging at least one temperature sensor 24 in the region of the belt edges, and connecting it for example to a transponder located in the tire; the temperature value can be transmitted via the transponder to the outside in contactless manner and can be received by an antenna affixed to the vehicle.

In addition to temperature sensors 24, additional sensors capable of detecting, for example, mechanical deformations of the tire in the tread region, the temperature of the tread, the air pressure inside the tire, the number of tire revolutions, etc. and capable of transmitting the measured values to the outside in contactless manner, which is known per se, can be disposed in the region between belt 10 and carcass 4, which region is designated in its entirety by reference numeral 26. The energy supply to the associated transponders can take place electromagnetically from the outside in a contactless manner, which is known per se.

Figure 2:
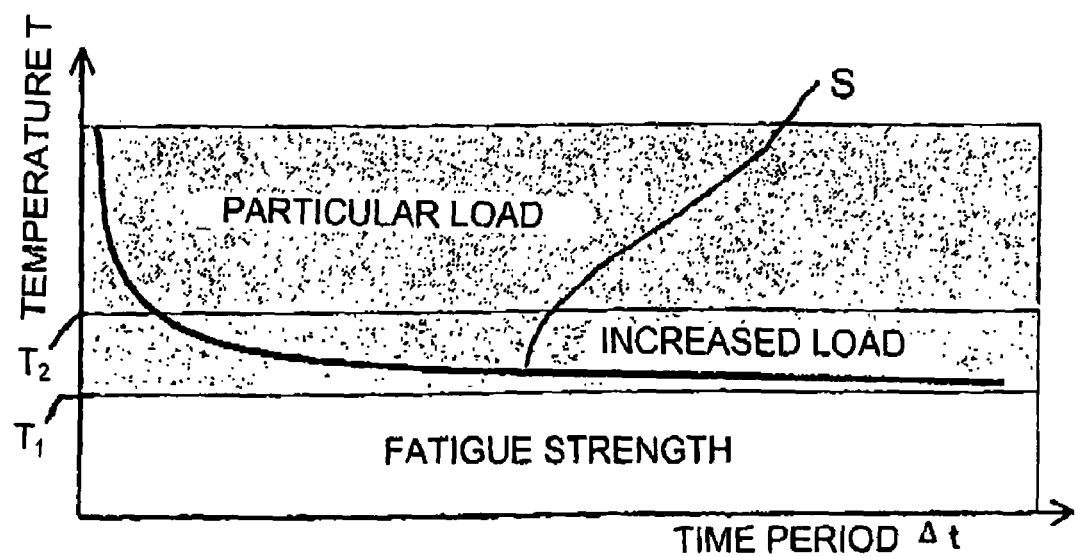
FIG. 2 shows a schematic diagram of the influence of temperature and time on the deterioration of a tire.

FIG. 2 illustrates the influence of temperature T on the tire deterioration, which temperature is measured in the region of the belt edges, i.e., at the junction between the tread and sidewall in the tire shoulder. Curve S indicates deterioration leading to a serious functional defect of the tire, i.e., to a tire that must be replaced. If temperature $T_1$ is exceeded, increased loading of the tire is caused, which reaches the threshold of permissible deterioration after a sufficiently long exposure period $\Delta t$. The permissible exposure period decreases as the temperature rises. If temperature $T_2$ is exceeded, the tire is under exceptional loading that will lead to tire failure after a relatively short period $\Delta t$. Therefore, it is necessary for tire monitoring to know the temperatures and their time durations, wherein the individual deterioration amounts have an integral effect, i.e., accumulate to form the total deterioration.

A tire deterioration model defining, for example, a deterioration value SW as the integral of temperature T, which is provided as necessary with a weighting parameter a(T), over the respective time for which the temperature is present, can be determined on the test bench in practical measurement runs or by model calculations, wherein the tire is irreversibly damaged as soon as this deterioration value exceeds a maximum value.

The following equation applies: $SW = \int a(T) T \, dt$ (1)

Figure 3:
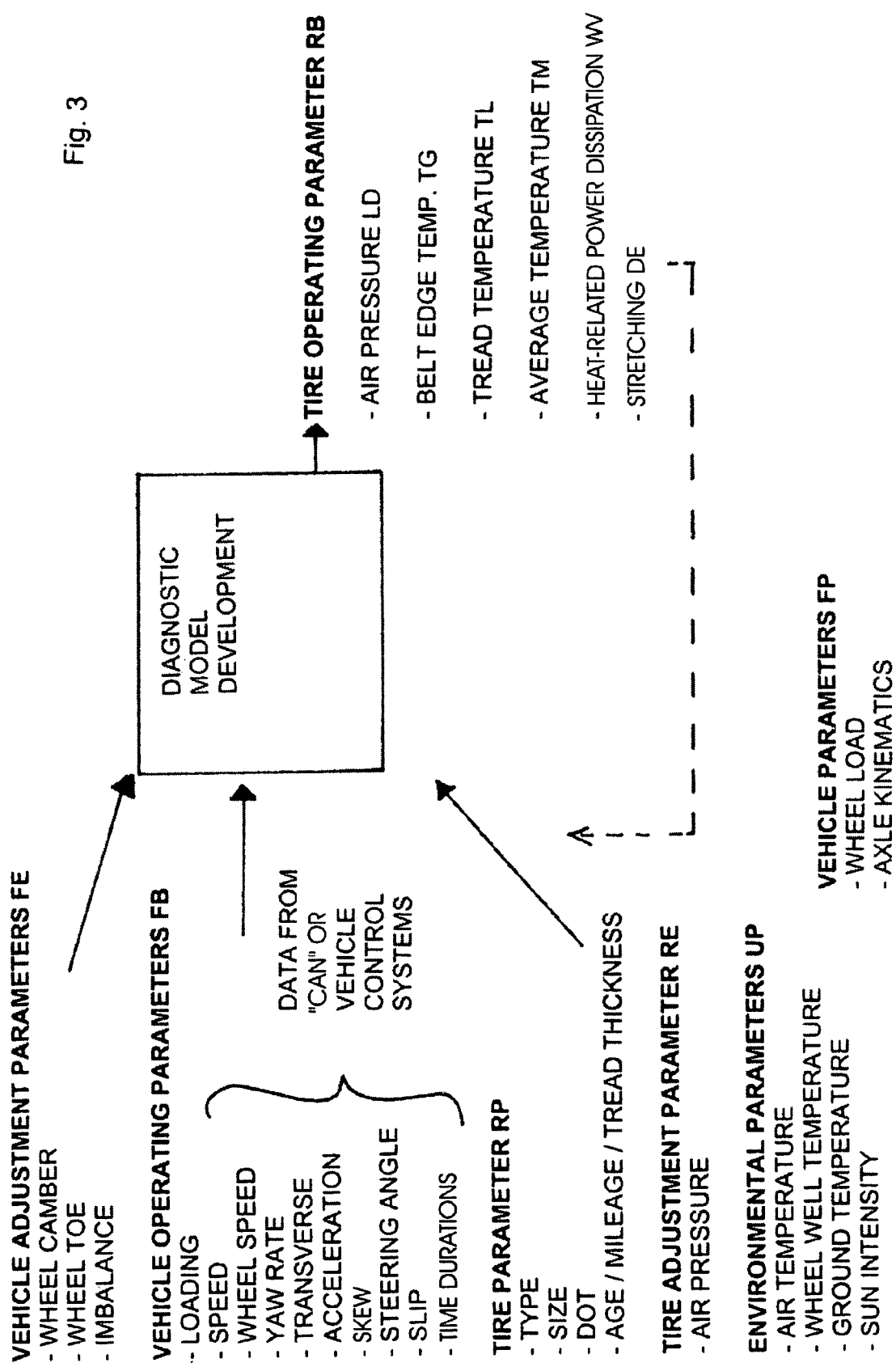
FIG. 3 shows the values influencing a diagnostic model.

On the whole, dependencies and interactions exist between a plurality of parameters, which are shown in their entirety in FIG. 3.

Tire wear depends principally on vehicle parameters FP, which are vehicle-specific and include values, such as, e.g., the wheel load or the axle kinematics that influence the tire operational demands during deflection, impact, steering, etc. The tire operational demands are also influenced by vehicle adjustment parameters, such as the adjustment of the wheel camber, the wheel toe, or an imbalance.

Vehicle operating parameters FB, which characterize the operation of the particular vehicle, such as load, speed, wheel speed, yaw rate, transverse acceleration, skew, steering angle, and slip, also influence the tire operational demands.

In addition, tire wear is dependent upon vehicle adjustment parameters FE, such as wheel camber, wheel toe, and imbalance.

Tire wear is also dependent upon the tire itself, whose parameters RP, such as type, size, DOT, age of the tire, and mileage traveled, are included in a tire wear model or diagnostic model.

As tire adjustment parameters RE, the air pressure or the tire inflation pressure influence the tire wear, which pressure is set at an air filling station, for example, according to the vehicle driver's manual.

Environmental parameters UP, such as air temperature, wheel well temperature, ground or roadway temperature, sun intensity, etc., also influence the tire wear.

A diagnostic model can be derived from the above-listed parameters using model calculations and/or driving tests; the diagnostic model directly calculates tire wear and/or its deterioration and/or values are calculable from the diagnostic model, which values are relevant to the tire deterioration, such as the temperature of the belt edge, temperature of the tread, average tire temperature, thermal power dissipation transferred to the tire, dynamically adjusting air pressure in the tire and stretching and/or mechanical operational demands of the tire. The right-side tire operating parameters RP can be calculated from the left-side parameters on the basis of model calculations that can be validated in bench tests as necessary or are derived from bench tests:

$$RP = \int (FE, FB, RP, RE, UP, FP) \quad (2)$$

On the whole, a diagnostic model results that provides a wide range of dependencies in the form of a set of equations and/or characteristic maps. Several of the left-side and right-side parameters are not independent of one another, e.g., wheel camber and wheel toe adjustments influence the skew or the temperatures influence the air pressure and the thermal power dissipation. The tread thickness can be calculated from the mileage and the conditions under which this mileage was traveled and/or may be directly measured periodically.

Deterioration value SW can be calculated from the tire operating parameters RP on the basis of a relationship similar to formula (1), namely:

$$SW = \int b(RP) RP \, dt \qquad (3).$$

Some of the calculated tire operating parameters can also be measured directly on the tire by means of sensors, as shown in FIG. 1, and then compared in the diagnostic model with the calculated values, so that an adaptation of the diagnostic model is possible.

The diagnostic model, which provides the relationships between the individual values of the parameters in the form of characteristic maps, algorithms, etc., can be used in both directions. If the parameter values on the left in FIG. 3 are known, the tire wear and/or a deterioration value for the tire can be calculated, wherein the attainment of a critical deterioration value can be displayed. Conversely, the parameter values on the right in FIG. 3 can be measured or determined indirectly so that the left-side parameters, in particular the vehicle adjustment parameters, wheel camber and wheel toe, can be deduced from the diagnostic model; as a result, defects of the vehicle can be identified from the diagnostic model and the measurement of the tire operating parameters, as well as other vehicle operating parameters and if necessary from environmental parameters, and the defects then can be displayed and corrected.

Hybrid forms are also possible, in which some left-side and some right-side parameters are measured and others are calculated.

The diagnostic model can be particularized to a greater or lesser extent according to the hardware complexity (number of sensors used) and software complexity. The vehicle operating parameters are, in particular, known in an ongoing manner when vehicles are equipped with driving stability systems. The same is true for the tire parameters and the environmental parameter air temperature, as well as for the vehicle parameters, which can include the target values for wheel camber and wheel toe. The tire operating parameters are calculated from this data using the diagnostic model, wherein it is advantageous for sustained monitoring of the diagnostic model to measure at least one of the tire operating parameters on the tire and to compare the measured tire operating parameter with the calculated value. Constants or dependencies used in the diagnostic model are then modified accordingly so that the diagnostic model and its input values, e.g. the mileage of the tire, are continuously updated. As more right-side tire operating parameters (FIG. 3) are measured, e.g., the stretching of the tread or the deformation of the sidewall or tire shoulder in addition to those parameters listed above, a defective wheel camber and/or wheel toe adjustments, imbalances of the wheel and/or tire, or other vehicle defects can be more precisely determined based upon the diagnostic model.

Figure 4:
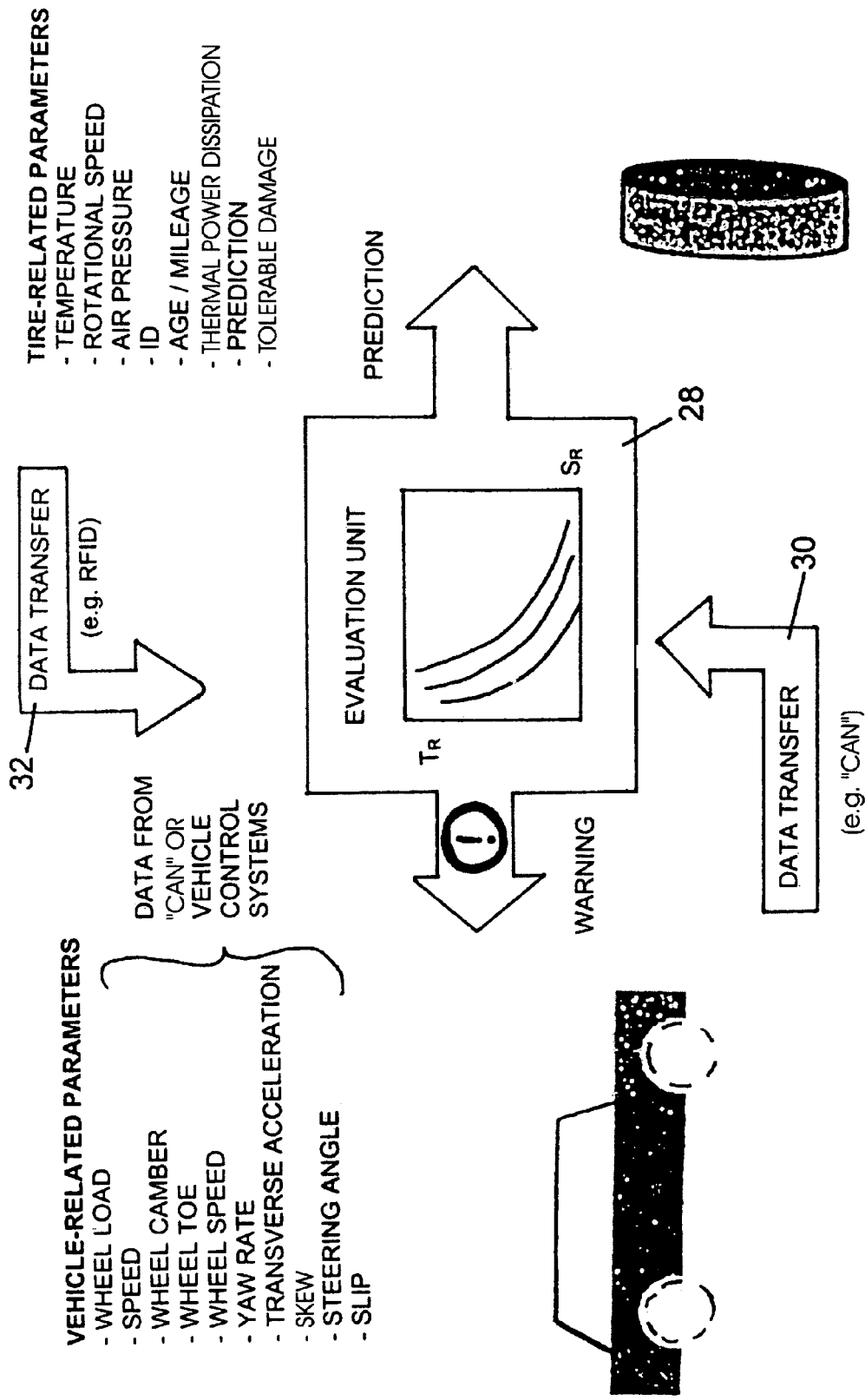
FIG. 4 shows a sketch explaining the function of a diagnostic system according to the present invention.

FIG. 4 illustrates the function of a diagnostic system that operates with the diagnostic model of FIG. 3.

Several vehicle parameters are shown on the left-side as examples only. Several tire parameters are listed on the right-side as examples. The left-side parameters are supplied, e.g. via a data bus 30, to an evaluation unit 28, which includes, in a manner known per se, a microprocessor having corresponding memory devices, in which the diagnostic model is stored. The tire parameters, such as temperature, rotating speed of the tire, an identification code for identifying the tire, are supplied to evaluation unit 28 from the particular tire via a contactless data transfer path 32. Data transfer path 32 can, e.g., utilize the RFID (radio frequency identification) method.

Depending on the complexity and design of the system and the performance requirements, warnings indicating defective vehicle adjustment parameters, e.g., wheel camber, wheel toe, or a worn tire or a tire that has been damaged to the point of being unusable, can be generated in the evaluation unit 28. In addition, prognostic values regarding the tire can be generated for the remaining service life or remaining tolerable damage, thereby ensuring that the tire is replaced in a timely fashion.

Of course, the values of the tire-related parameters calculated in the diagnostic model, e.g., tolerable damage, wear, or mileage, can be transferred via data transfer path 32 to the tire and stored there in a corresponding memory device. In this manner, each tire will carry the evaluation data pertinent to itself, which stored data can be read out immediately.

Figure 5:
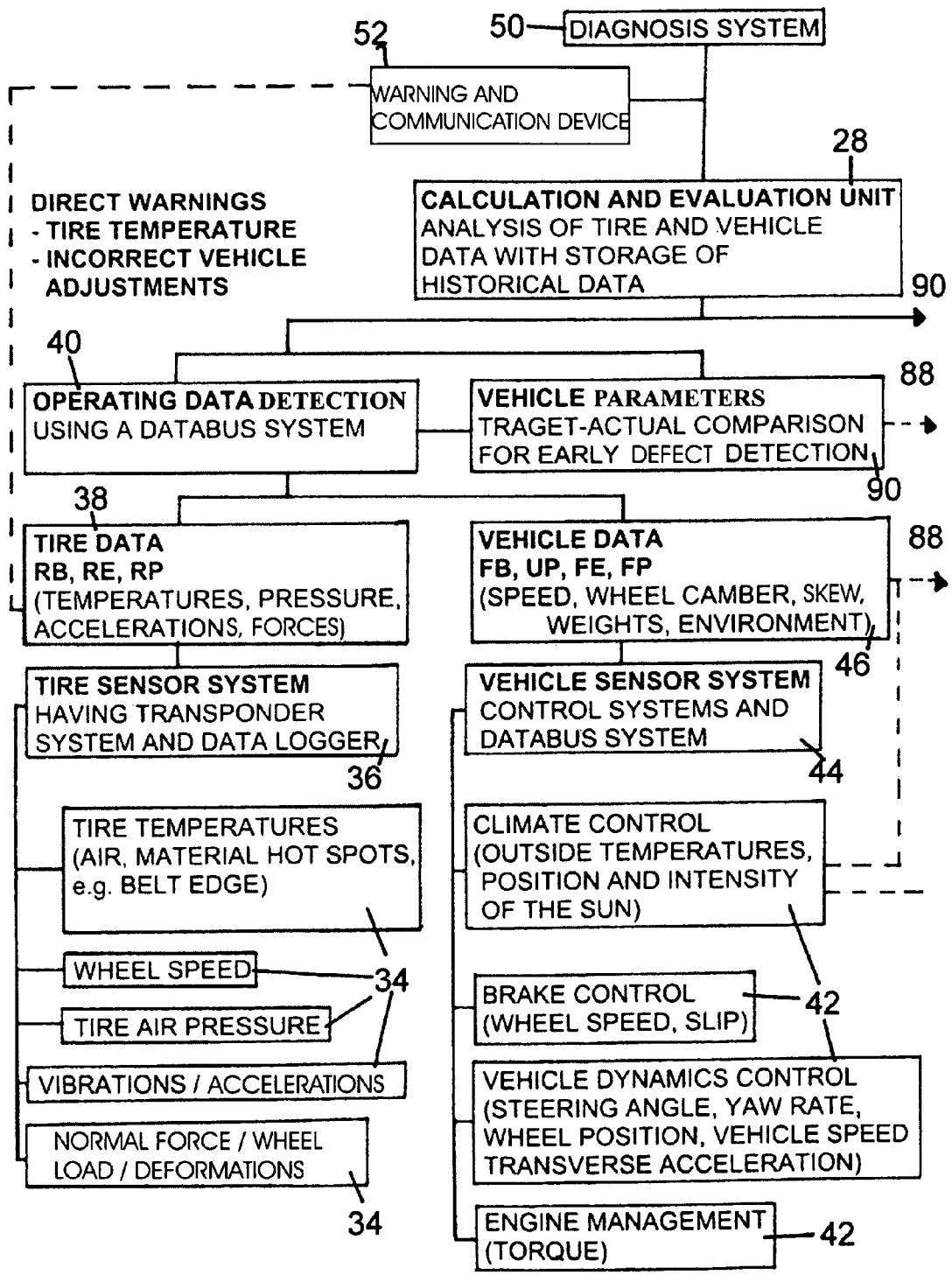
FIGS. 5 and 6 show a block diagram of a diagnostic system.
Figure 6:
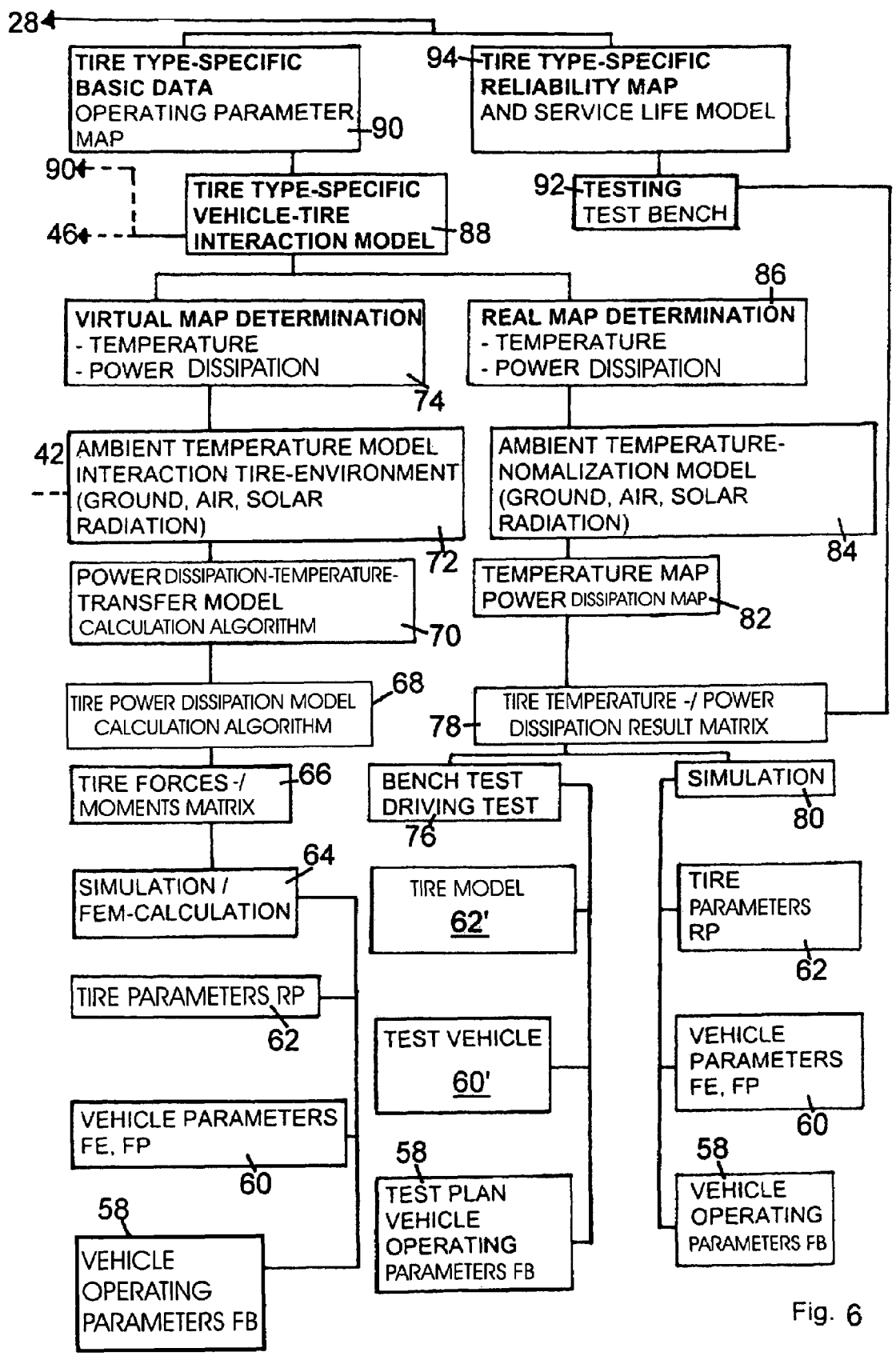

FIGS. 5 and 6 show a block diagram of a diagnostic system in an expanded construction.

Values such as tire temperatures, wheel speeds, tire air pressure, vibrations or accelerations at the wheel and/or the normal force, the wheel load and/or deformations of the tire, are detected by sensors 34 and supplied via a data transmission system, which is designated in its entirety as tire sensor system 36, to tire data unit 38, in which unit 38 at least some of the tire operating parameters RB in FIG. 3 and tire adjustment parameters RE are determined and also tire parameters RP are stored. The determined and stored parameters are supplied to an operating data unit 40.

Values such as external temperatures, position and intensity of the sun, wheel speeds and slip, values regarding driving dynamics, such as steering angle, yaw rate, wheel position, speed, transverse acceleration, and engine data, such as torque, are detected by additional sensors 42. This data is supplied via a data transmission device, which is designated in its entirety as vehicle sensor system 44, to a vehicle data unit 46, in which unit 46 all or individual vehicle operating parameters FB (FIG. 3), vehicle adjustment parameters FE, vehicle parameters FP, and environmental parameters UP are determined, or if determined in a vehicle-specific manner, these parameters are stored in the unit 46 beforehand. The indicated parameters are supplied to operating data unit 40, which is connected to calculation and evaluation unit 28 (also see FIG. 4).

The diagnostic system, which is designated in its entirety by reference numeral 50, also has warning and communication devices 52; for example, defect alarms can be issued via these devices 52 immediately in the event of unacceptably high tire temperatures.

FIG. 5 primarily shows the sensor components of the diagnostic system. FIG. 6 primarily shows the simulation-related components of diagnostic system 50.

Vehicle operating parameters FB (FIG. 3) are input into vehicle operating parameter unit 58. Vehicle parameters FE, FP are input into a vehicle parameter unit 60. Tire parameters RP are input into a tire parameter unit 62. The recited parameters may also be previously stored in tire data unit 38 and vehicle data unit 46.

A model calculation is used by a calculation unit 64 in order to calculate the forces and torques (66) acting in the tires from the data supplied by units 58, 60, and 62; based upon these forces and torques, the power dissipation and the temperatures of the tire 70 are calculated in a tire power dissipation model 68.

The respective environmental conditions are taken into consideration in an ambient temperature model 72, which can be connected via a circuit indicated by the dotted line to the climate control sensors so that the values calculated in unit 70 can be corrected; the tire power dissipation and the temperature distribution in the tire are calculated in virtual map unit 74 based on the accepted model.

In a branch parallel to the indicated units, a test vehicle 60', which corresponds to one of the vehicle parameters and is equipped with tires 62' corresponding to the tire parameters, is used in a bench test to conduct test runs corresponding to the vehicle operating parameters and to measure the power dissipation and tire temperature distribution (78).

A simulation calculation (80) that takes into account the vehicle operating parameters, vehicle parameters, and tire parameters, and in which the tire temperatures and power dissipation are also calculated, can be modified in view of the test bench results; the underlying model in calculating unit 64 also can be modified on the basis of these results.

Temperature map and power dissipation map 82, which can be converted into a real temperature map and a real power dissipation map 86, which map 86 takes into account environmental conditions (84), can be generated from the results 78 on the basis of different tests 76 and simulations 80 using a plurality of vehicles and tires; the real characteristic maps of unit 86 are determined on the basis of test results as opposed to the virtual characteristic maps of unit 74.

The two characteristic maps are combined in unit 88 to form one interaction model which combines tire type-specific data with vehicle-specific data.

Data calculated in interaction model 88 may be supplemented with data from vehicle operating parameter unit 46. Actual data from operating data unit 40 may be compared in a comparing unit 90 to calculated target data from unit 88.

In the event of a deviation, a warning alarm can be generated immediately.

Characteristic maps and/or algorithms, which link the individual parameters with one another in accordance with tire type-specific basic data and vehicle data, are generated from interaction model 88 in a map unit 90. Tire type-specific reliability and service life models, which are supplied together with the characteristic maps of unit 90 to calculation and evaluation unit 28 in which all links included in the set of equations 1, 2, and 3, for example, are present in this manner, are derived in unit 94 in further test bench measurements 92 using the data in unit 78.

The described diagnostic system may be used and modified in various ways.

Tire type-specific tire-vehicle interaction model 88, which as a whole determines the function of calculation and evaluation unit 28, can be developed primarily virtually (left branch of FIG. 6) or primarily using real tests (right branch of FIG. 6) or by combining both methods.

This allows the determination of tire temperature and/or power dissipation via virtually- or practically-determined characteristic maps, which are dependent upon known or measured tire parameters (RP), vehicle parameters (FE, FP), vehicle operating parameters (FB), and environmental parameters (UP), via estimation or calculation. At the same time, it is conversely also possible to use a known tire temperature or power dissipation to calculate and/or estimate one of parameters RP, FE, FP, FB.

Combining the two characteristic maps or models provides, among other things, the following possibilities and approaches:

In vehicle development and tire development:

The tire temperatures or power dissipation predicted or calculated for a certain vehicle/tire combination with different parameter adjustments (loads) can be compared to the service life of the corresponding tire that would be expected under these conditions (deterioration comparison). This makes it possible to evaluate the robustness of the tire as compared to the loads to be expected in combination with a certain vehicle type during operation. As a result, the design of tires and the coordination with the vehicle can be taken into consideration and tested during tire and vehicle development at a very early stage, in particular, when virtual methods for determining the characteristic maps are used, even before the first vehicle or tire model is available.

In the use of simulation methods:

The map and model-supported development of tire temperature and power dissipation, which is dependent upon the different adjustment and operating parameters, allows, at the same time as simulation, the adjustment of the temperature-dependent tire properties in tire simulation models, which properties directly (e.g., in the case of a change in the interior air pressure) or indirectly (e.g., via a change in the stiffness or the friction value) affect drivability and performance (traction or transmission of lateral forces).

As a result, the interaction model 88 is advantageously not limited to use within the diagnostic system. It is also a development instrument that can be used advantageously, e.g., when designing a tire for certain vehicles or vehicle types, because relevant parameters can be determined as a function of the tire parameters and the vehicle using the simulation calculations and bench tests by utilizing the vehicle operating parameters to calculate the tire deterioration, and thus the durability of the tire.

Tire type-specific reliability map (block 94) is determined from bench tests (block 92) for tires operated under predetermined operating demands. The connection line in FIG. 6 between blocks 78 and 92 indicates, as was already explained above, that the result matrix (block 78) may be referenced as a basis in bench tests (block 92). Tire type-specific reliability map/service life model (block 94) provides, similar to a mechanical strength map of components, the service life of the tire with respect to the operating temperature as a load value in the form of characteristic curves, as shown, e.g., in FIG. 2. As a result, precise predictions concerning service life and/or reliability are possible as early as the development phase of the tire.

Different parameters or data can be determined by means of widely-varying methods.

The rotational speed of a tire can be determined directly using the tire sensor system or indirectly using the vehicle sensor system.

Individual parameters from the vehicle sensor system (driving dynamics control, climate control, brake control, etc.), in particular data regarding the environment (position and intensity of the sun, outside air temperature and ground temperature), can also be determined using estimates from already available models. For example, the sun intensity, i.e., the incident radiation power per surface unit, can be approximated from a correlation between the ground and air temperature on the basis of the evaluation of saved meteorological data archives. The ambient temperature model also works without detailed available data in the direct environment of the tire using a sufficiently good approximation, in which it is assumed that the ambient temperature is an average value of the ground temperature and the air temperature.

In the virtual methods in which correlations between the tire type and vehicle are determined, methods for multi-body simulation, CAE/FEM methods, can be used in connection with statistical methods, such as DoE (design of experiments), regression analysis, etc.

In total, the present invention provides a flexibly usable diagnostic system that facilitates a warning regarding dangerous conditions and a retrieval of predicted remaining service life or defective adjustments by the sensors and the evaluation unit available in the vehicle; the system can be read out in the vehicle, as well as in a workshop, to determine the maintenance requirements of the vehicle. The characteristic maps, algorithms, and dependences used in the diagnostic model can be determined experimentally and/or acquired by simulation, CAD/FEM calculations, etc. A wide range of sensors, such as temperature and pressure sensors, rotational speed, speed, mileage, and yaw rate sensors, etc., can be used. Methods functioning in a contactless manner, e.g., on the basis of inductive power transmission and HF technology, are used for power and signal transmission between the wheel and vehicle.

One of the main components of the diagnostic system of the present invention is a correspondingly complex sensor-transponder unit disposed in the tire, in which sensor-transponder the operating parameters of the tire, such as interior air pressure, temperatures at different locations, expansions, forces, acceleration, etc. can be received and can be advantageously transmitted in a contactless manner to the evaluation unit in the vehicle.

Figure 7:
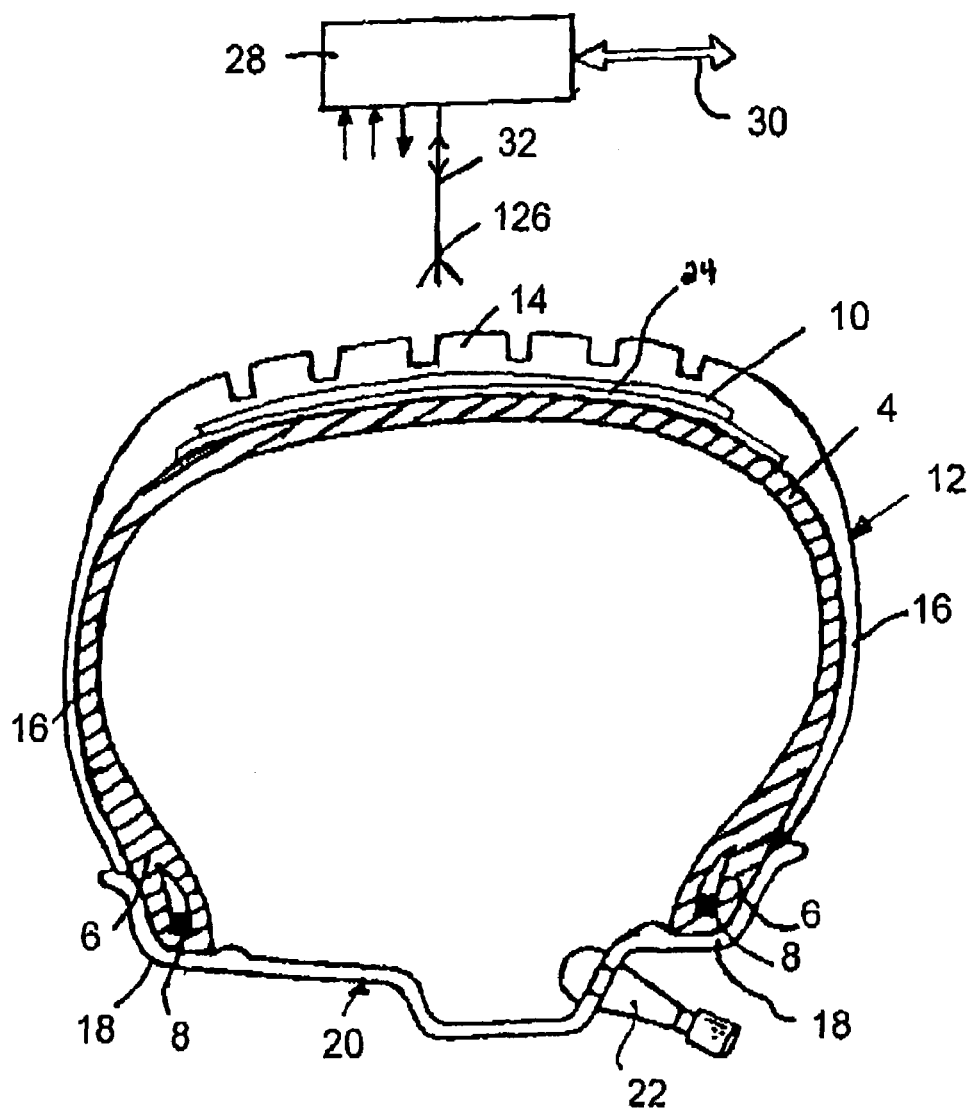
FIG. 7 shows a half cross section through a vehicle tire mounted on a wheel rim, modified with respect to FIG. 1, with parts of a vehicle monitoring system.

FIG. 7 shows a view of a tire similar to FIG. 1, in which a sensor network 124, which includes sensor units not shown in FIG. 7, is disposed, e.g., laminated or vulcanized, between belt 10 and carcass 4. The sensor units can be read out in the illustrated example via an antenna 126 affixed to the vehicle, which antenna is connected via a data line 32 to a control unit 28 or an evaluation unit 28 (FIG. 4); the unit can include inputs and outputs connected to vehicle sensors or other control units and is connected to vehicle bus system 30 (FIG. 4).

Figure 8:
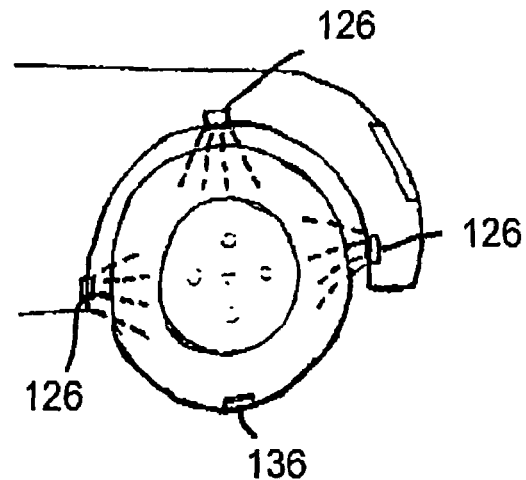
FIG. 8 shows a schematic representation of one possibility for reading out tire data.

FIG. 8 schematically shows three antennas 126, which are disposed in a vehicle fender at a distance from one another along the circumferential direction, which antennas are also offset from one another, if necessary, in the transverse direction of the vehicle and which antennas communicate with at least one transponder 136 included in sensor network 124 or are connected to a node of the sensor network. The configuration of the transponder(s) determines the number of to-be-provided antennas affixed to the vehicle.

Figure 9:
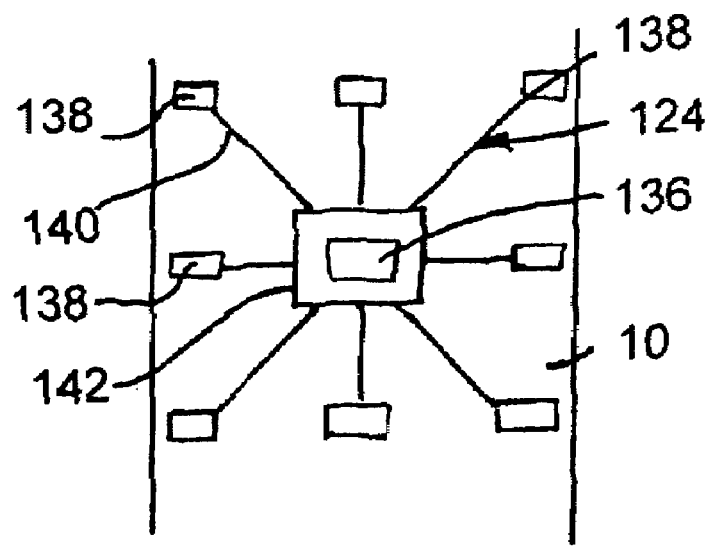
FIGS. 9-11 show plan views of parts of a deployed sensor network.
Figure 10:
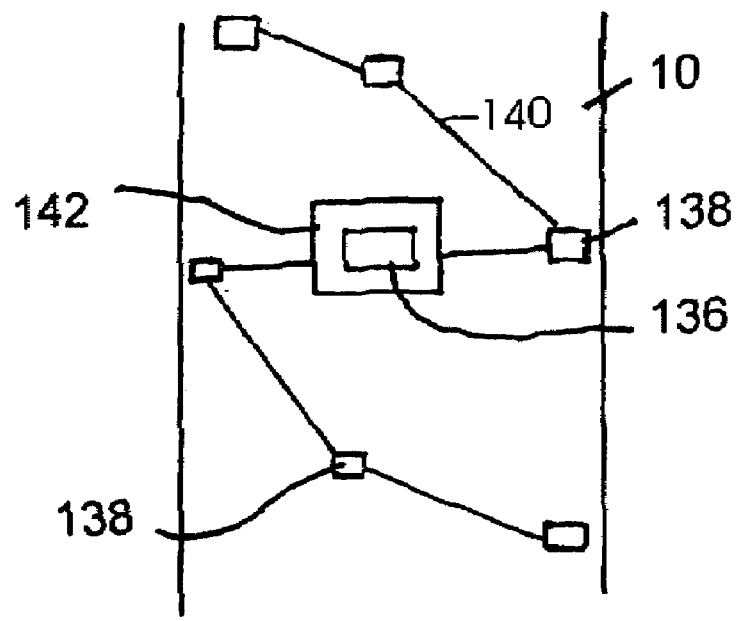
Figure 11:
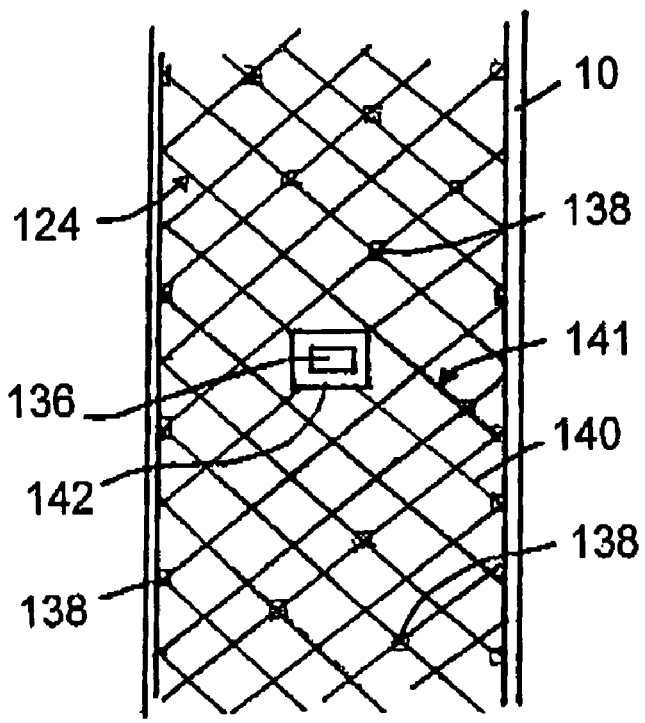

FIGS. 9 through 11 show views of the sensor network 124 from the inside of the tire, including belt 10 located underneath it.

In the embodiment according to FIG. 9, sensor units 138 included in the sensor network 124 are each connected via a line 140 to a node 142, which includes transponder 136.

In the embodiment according to FIG. 10, a plurality of serially-arranged sensors 138 is connected by a shared line 140 to transponder 136.

FIG. 11 shows an embodiment in which lines 140 form a diamond-shaped network 141, which is connected at node 142 to transponder 136.

Fiber-like lines 140 are advantageously made of steel cable, carbon, electrically conducting plastic, and other electrical conductors known from aeronautics, for example, and are combined with other materials or fibers, e.g. carbon, aramid, steel cable plastic, electrically conducting plastic ceramic fiber, etc., for the necessary insulation and strain relief; the composite material fibers or lines must be chemical-resistant and heat-resistant in order not to be damaged during vulcanization of the tire and require mechanical properties capable of withstanding the operational demands during tire operation.

Depending on the data processing technique, every sensor unit 138 is connected to central node 142 via one or more electrically insulated lines, or lines are shared by the individual sensor units when the sensor units have their own processors, for example, and may be individually queried by transponder 136 using multiplex or bus technology. As a result, the circuit configurations in FIG. 8 or 9, for example, can be embodied within a conductor or fiber network 141.

Depending on the desired number of sensors and/or the assembly of the tire with sensor units, the conductor and/or fiber network 141, which, equipped with sensor units 138, forms sensor network 124, which is positioned between belt 10 and carcass 4 and is vulcanized in place during production of the tire, is produced from necessary conductors 140. The width of sensor network 124, which is slightly larger than that of belt 10 in FIG. 1, may protrude into sidewalls 16 or not completely cover belt 10 depending on the desired sensor units. Sensor network 124 is also not required to extend around the entire periphery of the tire (viewed in the direction of travel). The individual fibers of the network can have a multi-wire design. A ground for all sensor units 138 and transponder 136 can be formed by the steel layer of belt 10 and every sensor unit and transponder 136 can be conductively connected to the steel layer. In the illustrated embodiment, node 142 forms, e.g., a base substrate having conductor paths for connecting conductors 140 and elements of the transponder situated on the base substrate, e.g. a processor, memory, antenna, and if necessary the power supply.

Depending on the construction, mechanically-stable fibers may extend throughout the entire substrate or may be connected with expansion elements integrated in the substrate for force measuring.

Sensor units 138 can be of a wide variety of different types depending on the to-be-determined physical values and/or operating parameters of the tire. Sensor units 138 can include a plurality of sensor elements, e.g., one for measuring the temperature, one for measuring the tire air pressure, one for measuring the pressure on the belt as well as a stretching measuring cell for measuring the forces or stretching (FIG. 11) on the fibers, which are a measure of the local stretching of the tire structure.

As a result of the sufficiently fine distribution of the sensor units over the tire contact area (footprint surface), the information is available in a form that allows representation of the particular measured value over the particular surface. These representations can be used in many ways, as will be described below.

Pressure measurements can be performed, for example, by pressure-sensitive foils or micro-measuring cells having piezoelectric elements or capacitors. Stretching of the tire structure may be measured by expansion-sensitive foils or micro-measuring cells (piezoelectrically or according to the capacitive principle). In a similar manner, the temperature distribution can be made piezoelectrically by resistance measuring elements, etc. The measuring principles are known per se and therefore need not be explained.

Figure 12:
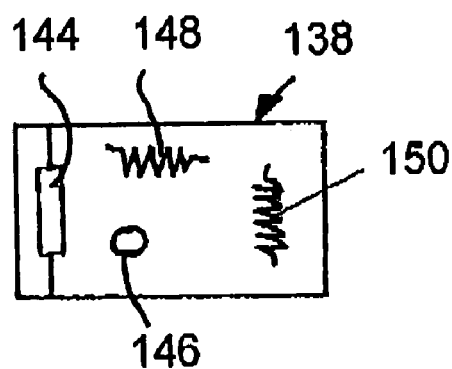
FIG. 12 shows a schematic representation of a sensor.

FIG. 12 schematically shows a sensor unit 138 having a temperature measuring element 144, a pressure measuring element 146, and two stretching measuring elements 148 and 150, which are positioned perpendicularly with respect to one another.

There are different options for transmitting the data detected by sensor units 138. One advantageous option is to transmit the data via transponder 136, which is assigned to node 142, to which sensor units 138 are connected.

Transponder 136 is inductively provided with power when it moves past one of antennas 126. Of course, transponder 136 is advantageously not positioned directly under belt 10, but rather laterally next to the belt, so that it is not shielded by the antenna(s) 126. The data transmission from transponder 136 via antenna(s) 126 to control unit 128 may be performed online so that in each case one of the sensor units is read out; in another method, the data of the individual sensor units is cyclically read in, buffered, and then read out, e.g., according to the sample-hold method, in a memory controlled by the transponder processor. The sensor units may be read out in a time or speed-controlled manner. The transponder and the associated transmission techniques are known per se and therefore need not be explained in detail.

For example, a temperature value, pressure value, stretching, etc. of a sensor can be read out at every wheel revolution so that a complete footprint of the tire is prepared after an appropriate number of revolutions. Depending on the available data processing capacity, a plurality of measured values assigned to the individual sensor units having a known position can be read out simultaneously so that a complete footprint of the tire is achieved quickly.

Minimally dynamic values, such as temperatures, can be read out at a slower frequency than quickly changing values, such as pressure and stretching distribution. Of course, temperature sensor elements are situated especially in the edge region of belt 10 in the tire shoulder, because the highest temperatures occur at this tire location, which high temperatures may damage the tire when the air pressure is insufficient or the loading is excessive.

It is not necessary for the data to be read out via a transponder, which has data processing capacity by means of corresponding electronic equipment (memory, processor). The individual sensor elements can have, for example, oscillating circuits having sensor-specific resonance frequencies so that the sensors can be read out directly in a frequency-specific manner. The measured signal may be provided by the detuning of the resonance frequency or modulation of the resonance frequency. Central node 142 having associated central transponder 136 is not necessary in this type of data transmission.

Fiber or conductor network 141 is not necessary. Given the low costs and the increasing miniaturization of transponders in which sensor elements are integrated and which have an overall pliable and flexible design, it is possible to dispose a plurality of individual sensor units having integrated transponders, as well as in some cases an additional individual power supply, in the tire at appropriate locations and to read them out in a contactless manner. Such pliable plastic chips having sufficient temperature resistance are described for example in the article by F. Miller "Polytronic: Chips von der Rolle", Fraunhofer Magazin 4, 2001, pgs. 8-12. Such chips can be used individually in a tire or arranged as a preassembled module in a fiber network.

The data acquired in the described measuring method from the "intelligent" tire as a result of the sensor units distributed therein may be evaluated in a plurality of ways. For this purpose, the control unit has a microprocessor and memory units so that operation of a read-out unit and evaluation unit contained therein is controlled and the results are displayed on a display unit. The temperature curve of the tire may be stored, wherein the time period for which a temperature exceeding a threshold value is present at a location on the tire shoulder is decisive for the tire service life or damage. An impermissibly high temperature can be used to determine insufficient air pressure in the tire. In combination with the mechanical operational demands on the tire, e.g. the stretching or deformation in the tread plane, incorrect wheel camber and wheel toe values of the vehicle may be determined so that a corresponding error message is issued by the control unit. Asymmetry of the temperature distribution can also be used to make conclusions regarding defective vehicle conditions, for example local hot flow due to a defective exhaust system, incorrect axle adjustments, etc. The footprint of the stretching and/or pressure distribution within the tire contact area (from the tire print) can make possible predictions concerning the transmittable frictional forces (longitudinal and transverse), the axle alignment, the wear behavior, rolling resistance behavior, hydroplaning behavior, etc. In addition to the diagnostic possibilities (e.g. axle alignment, bearing defects, etc.), evaluated pressure fluctuations can also make possible a prediction concerning mechanical tire defects. The determined values, if necessary with consideration of the vehicle speed and the momentary engine power, may also be supplied to the vehicle control and warning systems, for example a vehicle stability control system or a comfort system, which adjusts adaptive hydraulic mounts in accordance with the road- and vehicle condition.

On the whole, the present invention provides not only the ability to detect the static and dynamic operational demands of the tire, determine its power dissipation, monitor the operational reliability of the tire, and predict its service life, but also provides the ability to use the evaluation of the detectable detailed tire data to infer defects of the vehicle and to monitor their status.

Figure 13:
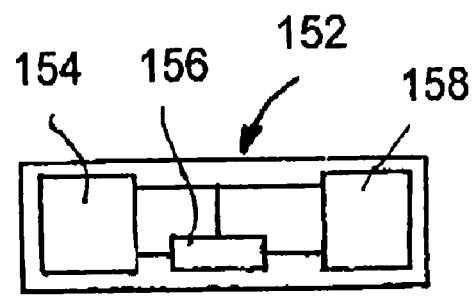
FIG. 13 shows a schematic representation of a self-sustaining sensor unit.

FIG. 13 illustrates a self-sustaining, revolution measuring unit 152, which can be integrated in sensor network 124 or vulcanized into the tire in an autonomous manner.

Revolution measuring unit 152 includes a sensor element 154, which emits a signal at every tire revolution. Sensor element 154 can include, for example, a piezoelectric element, against which an inertial mass presses with fluctuating force when the tire revolves, so that a voltage signal detected by sensor element 154 fluctuates. The output signal of sensor element 154 may be exploited for the power supply, which energy is accordingly produced in a power supply unit 156 and may also be used for generating a signal that integrates the revolutions of the tire; for every fluctuation of the output signal of sensor element 154 due to a revolution, the count of a memory unit 158 is incremented by one.

As a result of self-sustaining, revolution measuring unit 152, which is integrated in the tire, the tire itself contains a signal indicating the number of revolutions completed by the tire, which signal is independent of the vehicle for which the tire is used. The count of memory unit 158 can be read out in workshops. To prevent manipulation, it is not possible to reset memory unit 158 or it is only possible with special authorization.

Alternatively, the revolution measuring unit can be integrated in a valve affixed to the rim (e.g., valve 22 in FIG. 1).

Similar to revolution measuring unit 152, sensors 138 and/or transponder 136 can be supplied with power generated by the rotation of the tire. In addition, memory elements can be provided, in which certain values critical for the condition of the tire are stored in the tire itself, so that quality monitoring of the tire, for example for sidewall deterioration or mechanical overloading, can be identified from the tire itself by reading out the corresponding data memory.

The warning communications (52 in FIG. 5) can be divided into two levels, i.e., warnings regarding singular malfunctions, for example incorrect tire inflation pressure, incorrect axle alignments, excessive wheel load, etc. or warnings regarding combined malfunctions, in which a plurality of malfunctions are superimposed and their mutual interactions can result in additional dangerous operating conditions; for example, high wheel loads can have an increased effect on the tire temperature when suspension adjustments (wheel camber, wheel toe) are defective.

By means of additional devices, for example sensors and an evaluation system for determining tire vibrations during operation, the described diagnostic system can be augmented with a warning option that detects emerging or already-existing damage to the tire on the basis of the vibration curve.

The characteristic maps stored in the diagnostic system are preferably multi-dimensional; for example, characteristic maps indicating the temperature as a function of the wheel camber, wheel toe, weights, load distributions, and environmental conditions, such as the current parameters regarding driving dynamics, such as speed and yaw rate, may be stored for the tire temperature.

Depending on the number of parameters to be determined, different complexity levels are possible. The minimum solution is suitable for determining the remaining damage on the basis of the belt edge temperature and its time periods. The hardware includes sensors for the tire belt edge temperature, the time as well as advantageously the mileage, a transmission unit, an evaluation unit having a memory function, and a warning device. The evaluation unit includes the characteristic map of the particular tire with respect to the belt edge temperature and its time periods as well as the maximum possible damage and/or mileage. In an even simpler minimum solution, the sensors for the belt edge temperature are eliminated and these values are calculated on the basis of the values of the relevant parameters.

The following provides examples of the calculation for the thermal power dissipation in the tire as well as the calculation of the tire temperature:

A. Approximate calculation of thermal power dissipation $P_{loss}$ in the tire of one wheel. The power dissipation is the difference between the input- and output power.

$$P_{loss}=P_{in}-P_{out}$$

wherein the input power is the product of the wheel torque and the wheel speed.

$$P_{in}=M_y*\omega_y$$

The output power describes the power supplied by the wheel:

$$P_{out}=F_x*v_x+F_y*v_y+F_z*v_z,$$

wherein F is the respective force and v is the respective speed in each of the coordinate directions x, y, and z.

Power dissipation $P_{loss}$ can be broken down into 6 main components:

1. $P_{loss,vx}=F_x*V_{z,rel}=F_x*v_x*S_x$ Power converted by longitudinal slip $S_x$
2. $P_{loss,vy}=F_y*v_{y,rel}=F_y*v_x*\tan(\alpha)$ Power converted by skew $\alpha$
3. $P_{loss,vz}=F_z*v_{z,rel}=F_z*d\Delta z_{wheel}/dt$ Power converted by vertical tire deformation ("tire damping")
4. $P_{loss,\omega x}\cong 0$ ... not directly measurable power converted by dynamic camber change (negligible)
5. $P_{loss,Roll}=F_{x,Roll}*v_x=F_x+M_y/r_{stat}$ Power converted by the rolling resistance
6. $P_{loss,\omega z}=M_z*\omega_z$ Power converted by dynamic wheel toe change.

In summary:

$$P_{loss} = -M_y^\omega_y - F_x^v_x + \underbrace{P_{loss,vy} + P_{loss,vz} + P_{loss,\omega x} + P_{loss,\omega z}}_{P_{loss,roll}}$$

wherein:

x is the coordinate in the direction of the vehicle front (longitudinal), y is the coordinate in the direction of the vehicle side (lateral), z is the coordinate in the vertical direction upward from the vehicle (vertical), $\omega_x$ is the roll velocity, $\omega_y$ is the rotational speed (frequency), $\omega_z$ is the yaw rate, $F_x$ is the longitudinal force;

$F_y$ is the lateral-/side force;

$F_z$ is the vertical force (normal force/load), $M_x$ is the roll torque (breakdown torque), $M_y$ is the drive-/braking torque, $M_z$ is the yawing moment, and $v_{x,y,z}$ are the local wheel speeds in each coordinate direction.

As a result, the power dissipation can be calculated from purely mechanical parameters.

B. Approximate calculation of the tire temperature taking account of the heat balance, including thermal power dissipation from mechanical work and the environmental conditions:

Heat balance equation for the tire during operation:

$$\dot{Q}=\dot{Q}_{con}+\dot{Q}_{diff}+\dot{Q}_{dir}+\dot{Q}_w =>$$

$$c \cdot m \cdot \dot{T}_R(t) = \alpha \cdot A_1 \cdot T_a - \alpha \cdot A_1 \cdot T_R(t) -$$

$$-\alpha \cdot A_1 \cdot t \cdot \dot{T}_R(t) + \sigma \cdot \varepsilon \cdot A_2 \cdot (T_B^4 - T(t)_R^4) + \dot{Q}_o + \dot{Q}_w$$

The following influence parameters are taken into consideration in the heat balance of the physical model:

Convection $\dot{Q}_{con}$ (energy exchange with the ambient air)

Diffuse heat radiation $\dot{Q}_{diff}$ from the environment (heat transfer from ground, street)

Direct solar radiation $\dot{Q}_{dir}$

Proportion of mechanical work $\dot{Q}_w$ converted into heat in the tire.

In detail, these are:

Heat quantity in the tire:

$$Q=c \cdot m \cdot (T_R-T_0) \text{ or } \dot{Q}=c \cdot m \cdot \dot{T}_R(t)$$

where m is the mass of the tire, and c is the heat capacity of the tire. Convection:

$$Q_{con}=\alpha \cdot A_1 \cdot t \cdot \Delta T$$

where $A_1$ is the contact area between one medium and another medium, t is the duration of the heat transfer, $\rho T = T_a - T_R$ is the temperature difference of the heat transfer at t=0 between the outside temperature $T_a$ and the tire temperature $T_R$, α is the heat transfer coefficient (dependent upon the speed) where:

$$\alpha = 6.20 + 4.2 \cdot v \quad\quad v \leq 5 \text{ m/s}$$
$$\alpha = 7.520 \cdot v^{0.78} \quad\quad v > 5 \text{ m/s}$$
$$\alpha \text{ in W/m}^2 \cdot K, v \text{ in m/s}$$

Diffuse heat radiation:

$$P_{diff} = \dot{Q}_{diff} = \sigma \cdot \epsilon \cdot A_2 \cdot (T_B^4 - T(t)_R^4)$$

where $\sigma = 5.671\text{E-}08 \text{ W/(m}^2\text{K}^4)$—the radiation constant, $\epsilon = 0.95$—the heat transfer coefficient of rubber, $T_B$ is the temperature of the ground, $A_2$ is the surface of the tire.

Direct radiation (solar radiation):

$$\dot{Q}_0 = P_0 \cdot A_2$$

where:

$Q_0$ is the heat absorbed from solar radiation $P_0$=approx. 666 W/m² (climate- and weather-dependent).

Mechanical power: $\dot{Q}_w$ (corresponds to power dissipation $P_{loss}$)

The mechanical work lost to heat in the tire per unit time results from the calculation of power dissipation $P_{loss}$ in the tire as provided in Section A above.

Calculation operation for determining the tire temperature:

The quasi-fixed final value of the tire temperature $T_R$ results from an iterative algorithm for solving the heat balance equation for a sufficiently long time t with respect to a transient effect of the entire system.

C. Empirical approach to determination of tire temperature $T_R$ by approximation $$T_R = \frac{a * P_{loss} + b * T_{ground} + c * T_{inflow} + d * P_{radiation}}{N} + K \quad \text{(Formula T)}$$

where a, b, c, d, K, and N are the type-specific parameters from the map matrices acquired from testing or simulation.

K can assume the form of a constant correction term as well as the form of a variable having combinations from a plurality of other parameters—also of a higher order.

Power dissipation $P_{loss}$ results, for example, from the model explained in the above Section A, and the environmental parameters, street or ground temperature $T_{ground}$, air flow temperature $T_{flow}$, and solar radiation power $P_{radiation}$ (in heat balance equation: $P_0$), result from measurements or from parameter estimates by means of databases or correlation models.

Power dissipation $P_{loss}$ can alternatively also be approximated by means of a further empirical approach, e.g. in the form of:

$$P_{loss} = \frac{s * \text{Camber} + t * \text{Toe} + p * \text{Pressure} + l * \text{Load} + v * \text{Speed}}{N} + K \quad \text{(Formula P)}$$

The parameters, camber, toe, and pressure, are placeholders for characteristic values of the vehicle or tire adjustment parameters. The parameters, load and speed, are placeholders for characteristic values of the vehicle operating parameters.

The characteristic values may be either measured data from a series of tests or parameter estimates, e.g. from vehicle dynamics control.

s, t, p, l, v, K, and N are the parameters from type-specific map matrices acquired from testing or simulation.

K may assume the form of a constant correction term as well as the form of a variable having combinations from a plurality of other parameters—also of a higher order.

The empirical/statistical temperature model may also be used as a normalization model and/or correction model for considering the environmental conditions independently of power dissipation $P_{loss}$.

The significantly simplified approximation $T_{environment} = \frac{1}{2}(T_{ground} + T_{air})$ is used in the simplest case.

The following provides an example of the calculation of the tire temperature using the power dissipation:

The above-mentioned Formula P provides a simple way of calculating the power dissipation. Using tire type-specific vehicle-tire interaction model 88 (FIG. 6) as the result of virtual map determination 74 or real map determination 86, parameters s, t, p, l, v, K, and N are available for each characteristic "power dissipation" value. Vehicle parameters FE, FP (wheel camber, wheel toe, wheel load) and vehicle operating parameters FP (for example, speed), as well as tire parameters RP (type, for example) and tire adjustment parameters (air pressure, for example), are known and/or are values acquired from data measured at the vehicle, such as values from vehicle sensor system 44. Power dissipation $P_{loss}$ is calculated in the above-mentioned formula.

To calculate the tire temperature $T_R$, for example the temperature in the belt edge, the thus calculated power dissipation $P_{loss}$, is used in above-mentioned Formula T for the tire temperature $T_R$. Parameters a, b, c, d, K, and N are known from tire type-specific vehicle interaction model 88 as the result of virtual map determination 74 or real map determination 86 in each case for the characteristic "temperature" value.

Environmental parameters UP, such as $T_{ground}$, $T_{flow}$, $P_{radiation}$, are available, e.g., from the data of vehicle sensor system 44/42 (FIG. 5).

The following provides an example of the use of the diagnostic model from FIG. 3 from right to left:

Using the measurement of the tire operating temperature RB, e.g., the temperature at the belt edge, the diagnostic model can be used to estimate a vehicle adjustment parameter FE, e.g., the wheel camber, by means of calculation; the known temperature at the belt edge and the necessarily known tire parameters RP and at least one additional vehicle parameter FE, FP and vehicle operating parameter FB are inserted into the temperature map stored in tire type-specific vehicle-tire interaction model 88 (FIG. 6).

The described diagnostic system also provides the possibility of introducing suitable countermeasures via an active or passive technical device after it has been detected that the allowed values have been exceeded, for example in the case of the tire operating parameters. For example, the tire temperature can be limited by changing the air flow (increasing the air speed and/or conducting the air flow) in the environment of the tire via extendable aerodynamic conducting devices (wings/slots) or by performing a targeted cooling operation using a low-temperature gas flow. A low-temperature gas may be generated on-board in that an expanding, previously condensed compressed gas flow is blown against the tire or an air flow cooled by a heat exchanger, as used for vehicle climate control, is applied to the tire. Another possibility for counteracting an impermissibly high tire temperature is to increase the tire air pressure during travel to prevent mechanical power dissipation from being converted to heat.

In combination with corresponding control and regulation devices, a method for thermally conditioning the operating environment in the vicinity of the tire is also possible in this way, thereby operating the tire in a thermally optimum working range.

The above described features as well as the features of the subsequent claims may be used individually or in various combinations.

| Reference Number List | |
|---|---|
| 4 | Carcass |
| 6 | Bead |
| 8 | Core |
| 10 | Belt |
| 12 | Rubber layer |
| 14 | Tire tread |
| 16 | Sidewall |
| 18 | Shoulder |
| 20 | Wheel rim |
| 22 | Valve |
| 24 | Temperature sensor |
| 26 | Region |
| 28 | Evaluation unit |
| 30 | Data bus |
| 32 | Data transfer path |
| 34 | Tire sensors |
| 36 | Tire sensor system |
| 38 | Tire data unit |
| 40 | Operating data unit |
| 42 | Sensors |
| 44 | Vehicle sensor system |
| 46 | Vehicle operating parameter unit |
| 50 | Diagnostic system |
| 52 | Warning and communication devices |
| 58 | Vehicle operating parameter unit |
| 60 | Vehicle parameter unit |
| 60' | Fixed vehicle |
| 62' | Tire |
| 62 | Tire parameter unit |
| 64 | Calculation unit |
| 66 | Tire forces, moments |
| 68 | Tire power dissipation model |
| 70 | Tire power dissipation, temperatures |
| 72 | Environmental temperature model |
| 74 | Virtual map unit |
| 76 | Test bench |
| 78 | Temperature distribution, power dissipation |
| 80 | Simulation calculation |
| 82 | Temperature and power dissipation map |
| 84 | Environmental conditions |
| 86 | Real map unit |
| 88 | Interaction model |
| 90 | Comparison unit |
| 92 | Test bench measurements |
| 94 | Service life model |
| 124 | Sensor network |
| 126 | Antenna |
| 128 | Control unit |
| 136 | Transponder |
| 138 | Sensor unit |
| 140 | Line |
| 141 | Fiber network |
| 142 | Node |
| 144 | Temp. measuring element |
| 146 | Pressure measuring element |
| 148 | Expansion measuring element |
| 150 | Expansion measuring element |
| 152 | Rotation measuring unit |
| 154 | Sensor element |
| 156 | Power supply unit |
| 158 | Memory unit |

The invention claimed is:

1. A method for monitoring a vehicle tire, including:
storing, in a computer-readable medium, a vehicle- and/or tire-specific diagnostic model capable of calculating a value of at least one tire deterioration parameter from a value of at least one operating parameter pertaining to operational demands on the vehicle tire, wherein the diagnostic model includes at least one vehicle adjustment parameter selected from wheel camber and wheel toe and the at least one tire deterioration parameter comprises a temperature prevailing in a tire material proximal to a junction between a sidewall and a tread of the vehicle tire;
storing, in a computer-readable medium, a tire deterioration model capable of ascertaining a tire deterioration characterizing value from a time progression of the value of the at least one tire deterioration parameter, wherein the tire deterioration model contains an integral over time of the temperature prevailing in the tire material proximal to the junction between the sidewall and the tread of the vehicle tire;
determining a value of the at least one vehicle adjustment parameter,
detecting the value of the at least one operating parameter;
determining the value of the at least one tire deterioration parameter using the stored diagnostic model based upon at least the determined value of the at least one vehicle adjustment parameter and the detected value of the at least one operating parameter;
detecting the time progression of the value of the at least one tire deterioration parameter value;
determining the tire deterioration characterizing value based upon the stored tire deterioration model and at least the integral over time of the detected value of the at least one tire deterioration parameter value;
generating a prognosis representing the condition of the tire based upon the tire deterioration characterizing value; and
outputting the prognosis.

2. A method according to claim 1, further comprising:
calculating the value of the at least one tire deterioration parameter, detecting the value of the at least one tire deterioration parameter using a sensor, and adapting the tire deterioration model in the case of a difference between the calculated value and the detected value.

3. A method according to claim 1, further comprising detecting a value of at least one environmental parameter and including the value of the at least one environmental parameter in the diagnostic model.

4. A method according to claim 1, further comprising generating a warning indicating that the tire is irreversibly damaged when the tire deterioration characterizing value exceeds a maximum value.

5. A method according to claim 4, further comprising:
calculating the value of the at least one tire deterioration parameter,
detecting the value of the at least one tire deterioration parameter using a sensor,
adapting the tire deterioration model in the case of a difference between the calculated value and the detected value,
detecting a value of at least one environmental parameter and
including the value of the at least one environmental parameter in the diagnostic model.

6. A method for monitoring at least one vehicle adjustment parameter selected from wheel camber and wheel toe, including:
storing, in a computer-readable medium, a vehicle- and tire-specific diagnostic model capable of calculating at least one value of the wheel camber or the wheel toe from at least a value of at least one tire deterioration parameter and a value of at least one vehicle operating parameter;
detecting the value of the at least one tire deterioration parameter;
detecting the value of the at least one vehicle operating parameter;
calculating at least one value of the wheel camber or wheel toe by inputting at least the detected values into the stored vehicle- and tire-specific diagnostic model;
generating a result indicating the at least one calculated value of the wheel camber or wheel toe; and
outputting the result.

7. A method according to claim 6, further comprising detecting a time progression of the at least one tire deterioration parameter value and including the detected time progression in the diagnostic model.

8. A method according to claim 7, wherein the value of at least one tire deterioration parameter comprises a temperature prevailing in a tire material proximal to a junction between a sidewall and a tread of the vehicle tire.

9. A method according to claim 8, further comprising:
calculating the value of the at least one vehicle adjustment parameter,
detecting the value of the at least one vehicle adjustment parameter using a sensor, and
adapting the diagnostic model in the case of a difference between the calculated value and the detected value.

10. A method according to claim 9, further comprising detecting a value of at least one environmental parameter and including the detected value in the diagnostic model.

11. A method according to claim 6, further comprising:
calculating the value of the at least one vehicle adjustment parameter,
detecting the value of the at least one vehicle adjustment parameter using a sensor, and adapting the diagnostic model in the case of a difference between the calculated value and the detected value.

12. A method according to claim 11, further comprising detecting a value of at least one environmental parameter and including the detected value in the diagnostic model.

13. A method for generating a vehicle-tire interaction model, including:
calculating a tire- and vehicle-specific virtual map, which includes at least a temperature prevailing in a tire material proximal to a junction between a sidewall and a tread of the tire, as a function of at least one vehicle adjustment parameter selected from wheel camber and wheel toe, at least one vehicle operating parameter and at least one tire adjustment parameter;
test-based determining a tire- and vehicle-specific real map, which includes at least the temperature prevailing in the tire material proximal to the junction between the sidewall and the tread of the tire, as a function of at least one vehicle adjustment parameter selected from wheel camber and wheel toe, at least one vehicle operating parameter and at least one tire adjustment parameter;
combining the virtual and real maps to form the vehicle-tire interaction model; and
storing the vehicle-tire interaction model in a computer-readable medium.

14. A method according to claim 13, wherein the tire temperature is calculated from a power dissipation model that includes power converted by longitudinal slip, skew, vertical deformation, rolling resistance and dynamic wheel toe change.

15. A method for generating a vehicle-tire reliability map, including:
determining a tire- and vehicle-specific map, which includes at least one parameter relevant to deterioration of a vehicle tire, as a function of at least one vehicle adjustment parameter selected from wheel camber and wheel toe, at least one vehicle operating parameter and at least one tire adjustment parameter, wherein the at least one parameter relevant to deterioration of a vehicle tire includes a temperature in a tire material proximal to a junction between a sidewall and a tread of the vehicle tire;
test-based determining the service life of the vehicle tire for different values of the at least one parameter relevant to deterioration of the vehicle tire;
generating the vehicle-tire reliability map from the tire- and vehicle-specific map and the determined service life data; and
storing the vehicle-tire reliability map in a computer-readable medium.

16. A tire monitoring system, including:
means for storing a vehicle- and/or tire-specific diagnostic model capable of calculating a value of at least one tire deterioration parameter from a value of at least one operating parameter pertaining to operational demands on the vehicle tire, wherein the diagnostic model includes at least one vehicle adjustment parameter selected from wheel camber and wheel toe and the at least one the deterioration parameter is a temperature prevailing in a tire material proximal to a junction between a sidewall and a tread of the vehicle tire;
means for storing a tire deterioration model capable of ascertaining a tire deterioration characterizing value from a time progression of the value of the at least one tire deterioration parameter, wherein the tire deterioration model contains an integral over time of the temperature prevailing in the tire material proximal to the junction between the sidewall and the tread of the vehicle tire;

means for determining a value of the at least one vehicle adjustment parameter, at least one sensor arranged and constructed to detect the value of the at least one operating parameter;

means for determining the value of the at least one tire deterioration parameter using the diagnostic model based upon the determined value of the at least one vehicle adjustment parameter and the detected value of the at least one operating parameter;

means for detecting the time progression of the value of the at least one tire deterioration parameter value; and means for determining the tire deterioration characterizing value based upon the tire deterioration model and the integral over time of the value of the at least one tire deterioration parameter value.

17. A vehicle tire monitoring system according to claim 16, further comprising:

means for calculating the value of the at least one tire deterioration parameter, at least one sensor arranged and constructed to detect the value of the at least one tire deterioration parameter, and means for adapting the tire deterioration model in the case of a difference between the calculated value and the detected value.

18. A vehicle tire monitoring system according to claim 16, further comprising means for detecting a value of at least one environmental parameter, wherein the diagnostic model includes the detected value of the at least one environmental parameter.

19. A vehicle diagnostic system, including:

means for storing a diagnostic model containing relationships between at least one vehicle adjustment parameter selected from wheel camber and wheel toe, at least one vehicle operating parameter and at least one tire adjustment parameter, means for detecting at least one tire operating parameter and means for ascertaining the at least one vehicle adjustment parameter by entering the at least one detected tire operating parameter into the diagnostic model.

20. A vehicle diagnostic system according to claim 19, wherein the at least one tire operating parameter is selected from at pressure, belt edge temperature, tread temperature, thermal power dissipation and stretching.

21. A computer-readable medium comprising a computer program recorded thereon, the computer program comprising:

a vehicle- and/or tire-specific diagnostic model capable of calculating a value of at least one tire deterioration parameter from a value of at least one operating parameter pertaining to operational demands on the vehicle tire, wherein the diagnostic model includes at least one vehicle adjustment parameter selected from wheel camber and wheel toe and the at least one tire deterioration parameter comprises a temperature prevailing in a tire material proximal to a junction between a sidewall and a tread of the vehicle tire; and a tire deterioration model capable of ascertaining a tire deterioration characterizing value from a time progression of the value of the at least one tire deterioration parameter, wherein the tire deterioration model contains an integral over time of the temperature prevailing in the tire material proximal to the junction between the sidewall and the tread of the vehicle tire;

the computer program further comprising instructions that, when executed by a computer, perform the functions of:

determining a value of the at least one vehicle adjustment parameter, detecting the value of the at least one operating parameter;

determining the value of the at least one tire deterioration parameter using the stored diagnostic model based upon at least the determined value of the at least one vehicle adjustment parameter and the detected value of the at least one operating parameter;

detecting the time progression of the value of the at least one tire deterioration parameter value;

determining the tire deterioration characterizing value based upon the stored tire deterioration model and at least the integral over time of the detected value of the at least one tire deterioration parameter value;

generating a prognosis representing the condition of the tire based upon the tire deterioration characterizing value; and outputting the prognosis.

22. A computer-readable medium according to claim 21, wherein the computer program further comprises instructions that, when executed by a computer, perform the function of generating a warning indicating that the tire is irreversibly damaged when the tire deterioration characterizing value exceeds a maximum value.

* * * * *